United States Patent
McCabe

[19]

[11] Patent Number: 6,132,181
[45] Date of Patent: *Oct. 17, 2000

[54] WINDMILL STRUCTURES AND SYSTEMS

[76] Inventor: Francis J. McCabe, #6 Bunker Hill Rd., Ottsville, Pa. 18942

[*] Notice: This patent is subject to a terminal disclaimer.

[21] Appl. No.: 09/012,652

[22] Filed: Jan. 23, 1998

Related U.S. Application Data

[63] Continuation-in-part of application No. 08/685,134, Jul. 24, 1996, Pat. No. 5,711,653, which is a continuation-in-part of application No. 08/507,129, Jul. 31, 1995, Pat. No. 5,599,172.

[51] Int. Cl.[7] .............................. F04B 17/02; F04D 29/38
[52] U.S. Cl. ........................ 417/334; 417/244; 415/4.3; 415/4.5; 416/11; 416/223 R; 416/237; 416/244 A; 416/245 R; 416/DIG. 4; 290/55
[58] Field of Search ............................... 415/2.1, 4.3, 4.5, 415/905, 908; 416/9–11, 244 R, 244 A, 245 R, DIG. 4, 223 R, 228, 235, 236 R, 237, 197 R, 197 A, 197 B; 417/244, 334; 60/398; 290/44, 55; 244/198, 218

[56] References Cited

U.S. PATENT DOCUMENTS

| | | | |
|---|---|---|---|
| 756,616 | 4/1904 | Fornander | 416/11 |
| 984,599 | 2/1911 | Pichault | 415/4.5 |
| 996,741 | 7/1911 | Wait | 416/235 |
| 1,025,428 | 5/1912 | Stanschus . | |
| 1,035,431 | 8/1912 | Ericson | 60/398 |
| 2,004,853 | 6/1935 | Crary . | |
| 2,048,732 | 7/1936 | Dunn | 290/55 |
| 2,117,788 | 5/1938 | Cable et al. | 416/11 |
| 2,652,699 | 9/1953 | Romani | 416/DIG. 4 |
| 3,339,078 | 8/1967 | Crompton | 415/4.5 |
| 3,807,663 | 4/1974 | Bartoe . | |
| 3,910,531 | 10/1975 | Leomand . | |
| 4,021,135 | 5/1977 | Pedersen et al. . | |
| 4,055,950 | 11/1977 | Grossman . | |
| 4,075,500 | 2/1978 | Oman et al. . | |
| 4,080,100 | 3/1978 | McNeese . | |
| 4,132,499 | 1/1979 | Igra . | |
| 4,140,433 | 2/1979 | Eckel . | |
| 4,143,992 | 3/1979 | Crook . | |
| 4,204,799 | 5/1980 | deGeus . | |
| 4,236,083 | 11/1980 | Kenney . | |
| 4,324,985 | 4/1982 | Oman . | |
| 4,447,738 | 5/1984 | Allison . | |
| 4,620,833 | 11/1986 | Townsend | 416/237 |
| 4,655,122 | 4/1987 | McCabe . | |

(List continued on next page.)

FOREIGN PATENT DOCUMENTS

| | | | |
|---|---|---|---|
| 365045 | 9/1906 | France . | |
| 2371586 | 7/1978 | France | 416/11 |
| 928040 | 5/1955 | Germany | 416/DIG. 4 |
| 2717679 | 10/1978 | Germany | 60/398 |
| 91378 | 5/1983 | Japan | 416/DIG. 4 |
| 39960 | 1/1937 | Netherlands . | |
| 11240 | 2/1913 | United Kingdom | 290/44 |

(List continued on next page.)

OTHER PUBLICATIONS

Kentfield & Clavelle, "The Flow Physics of Gurney Flaps, Devices for Improving Turbine Blade Performance," (1993), pp. 24–34, Wind Engineering, vol. 17, #1, Brentwood, Essex, GB.

Gurney flap illustrations on automobile chassis (no date).

*Primary Examiner*—Christopher Verdier
*Attorney, Agent, or Firm*—Frank J. Benasutti

[57] ABSTRACT

A windmill having a plurality of radially extending blades, each being an aerodynamic-shaped airfoil having a cross-section which is essentially an inverted pan-shape with an intermediate section, a leading edge into the wind, and a trailing edge which has a flange doubled back toward the leading edge and an end cap. The blade is of substantial uniform thickness. An air compressor and generator are driven by the windmill. The compressor is connected to a storage tank which is connected to the intake of a second compressor.

14 Claims, 8 Drawing Sheets

U.S. PATENT DOCUMENTS

| | | | |
|---|---|---|---|
| 4,671,742 | 6/1987 | Gyimesi | 417/334 |
| 4,720,640 | 1/1988 | Anderson et al. . | |
| 4,784,570 | 11/1988 | Bond . | |
| 5,332,354 | 7/1994 | Lamont . | |
| 5,457,346 | 10/1995 | Blumberg . | |
| 5,599,172 | 2/1997 | McCabe . | |
| 5,711,653 | 1/1998 | McCabe . | |

FOREIGN PATENT DOCUMENTS

| | | |
|---|---|---|
| 407633 | 3/1934 | United Kingdom . |
| 643237 | 9/1950 | United Kingdom . |
| 2036193 | 6/1980 | United Kingdom . |
| 2068472 | 8/1981 | United Kingdom . |
| 2175963 | 12/1986 | United Kingdom . |
| 8100286 | 2/1981 | WIPO . |
| 9201866 | 2/1992 | WIPO . |

WINDMILL STRUCTURES AND SYSTEMS

CROSS REFERENCE TO RELATED APPLICATIONS

This application is a continuation-in-part of my prior application Ser. No. 08/685,134 filed Jul. 24, 1996 entitled AIR LIFTED AIRFOIL, now U.S. Pat. No. 5,711,653 the disclosure of which is incorporated herein by reference; which was a continuation-in-part of my prior then application Ser. No. 08/507,129 filed Jul. 31, 1995 entitled WIND ENERGY CONVERSION SYSTEM, now U.S. Pat. No. 5,599,172, the disclosure of which is also incorporated herein by reference.

TECHNICAL FIELD

This invention relates to improvements in windmills, and more particularly, to the aerodynamic shape of an airfoil windmill blade to exhibit improved lift characteristics and the windmill apparatus to store air under pressure or use the rotation of the windmill directly.

BACKGROUND ART

In the prior art, a wide variety of shapes have been used to harness the power of air. See, for example, the schematic prior art drawings shown in FIGS. 1A–1D. These shapes are designed primarily to act in response to air flowing in the direction of the arrow identified as "air flow" in FIGS. 1–3, impacting upon the angle of attack at which the airfoil blade is mounted, and causing the blade to lift. In a typical airplane wing (airfoil), for example, the angle of attack is such that a negative pressure is created above the wing (blade or airfoil) and the wing rises as the air flows across it.

In my prior art U.S. Pat. No. 4,655,122, I disclosed an improved aerodynamic shape which comprised essentially a planar face portion and leading and trailing edges associated with opposing ends of the face portion in a pan-shaped enclosure shown more particularly in the detailed cross section of FIG. 4 of that patent. This blade was shown in use in an air damper where one or more blades were pivoted for rotation within a frame. In that environment, the blades provided an increased lift when forced to open by escaping air from a structure, and thus this permitted the blades to be constructed of a relatively heavy gauge material without compromising damper efficiency. The air flow patterns and dimensions are also disclosed in detail.

Also in the prior art, it was known to use windmills with air compressor units that are powered by the wind energy turning the windmill, to store air under pressure for use, for example, in generating electricity. See, for example, U.S. Pat. Nos. 4,055,950; 4,236,083 and 4,447,738.

Windmill type designs have also been used in wind turbines with various shaped impeller blades disposed at various angles and encased in a cowling designed to direct the wind over the blades. See, for example, U.S. Pat. Nos. 1,025,428; 4,021,135; 4,140,433; 4,132,499; 4,133,992; 4,324,985 and 4,720,640.

One of the primary goals of the prior art windmill configurations was to get more revolutions per minute (rpm) out of the device at lower wind speeds and more power at similar rpm. Thus, the blade configurations were such as to pass air quickly through the device. To do this, the blades would be so configured and positioned for maximum power and not to interfere with each other's air flow.

One of the problems with prior art windmill devices was that in sustained high winds they would tend to "run away" and break up. Furthermore, at low winds or intermittent winds, they could not produce the sustained energy, i.e., constant speed, necessary to produce, for example, electricity.

In my work with windmills, I experimented with various shaped blades, such as that disclosed in my U.S. Pat. No. 5,599,172, for a wind energy conversion system. Therein, I disclosed a new wind energy conversion system for particular application to stored energy, such as compressed air. In accordance with my invention, energy was extracted from the air movement at low speeds. The configuration and spacing of the blades and the shaping of the device which supports them was such that there was a minimum negative interaction between adjacent blades to provide more torque at slower speeds. In accordance with my device, I collected as much air as possible within the device, and thus I collected as much force as possible. Further, the shape, positioning and configuration of the blades within the device tended to prevent it from running away; in other words, there was actually a rotary speed limiting effect.

It became apparent to me that the preferred blade structure had characteristics which were not known in the prior art.

DISCLOSURE OF THE INVENTION

Summary of the Invention

I have invented an aerodynamic-shape for an airfoil comprising a structure having a cross-section shape comprising an intermediary portion and leading and trailing edges associated with opposite edges of the intermediary portion to form an essentially pan-shaped structure in cross-section with convex and concave surfaces; and having a flange extending from the trailing edge back toward the leading edge in the concave area. The leading edge is defined by the edge which is directed into the flow of air. When mounted in a windmill, the blade has an end cap on the end radially remote from its mounting.

DESCRIPTION OF THE PREFERRED EMBODIMENTS

Figure 1A:
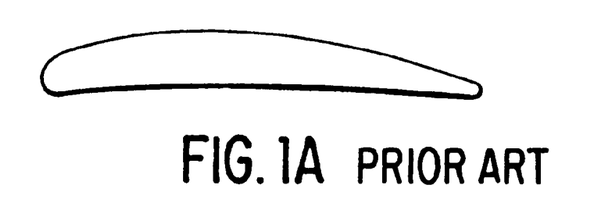
FIGS. 1A–1D are schematic views of various prior art cross-sections of airfoils.
Figure 1B:
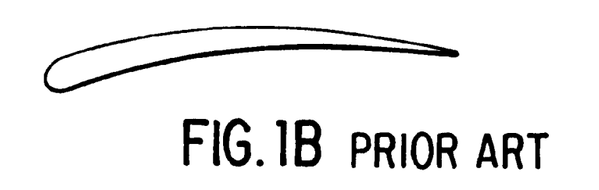
Figure 1C:
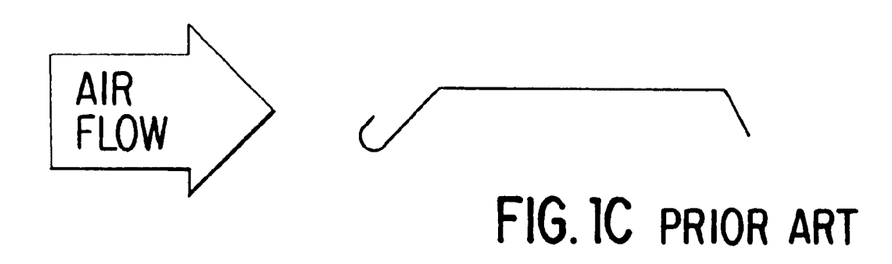
Figure 1D:
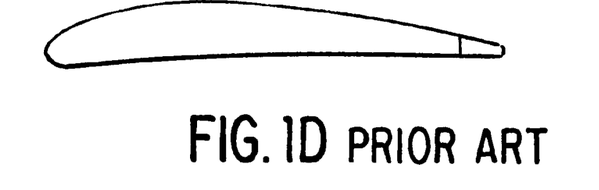
Figure 2:
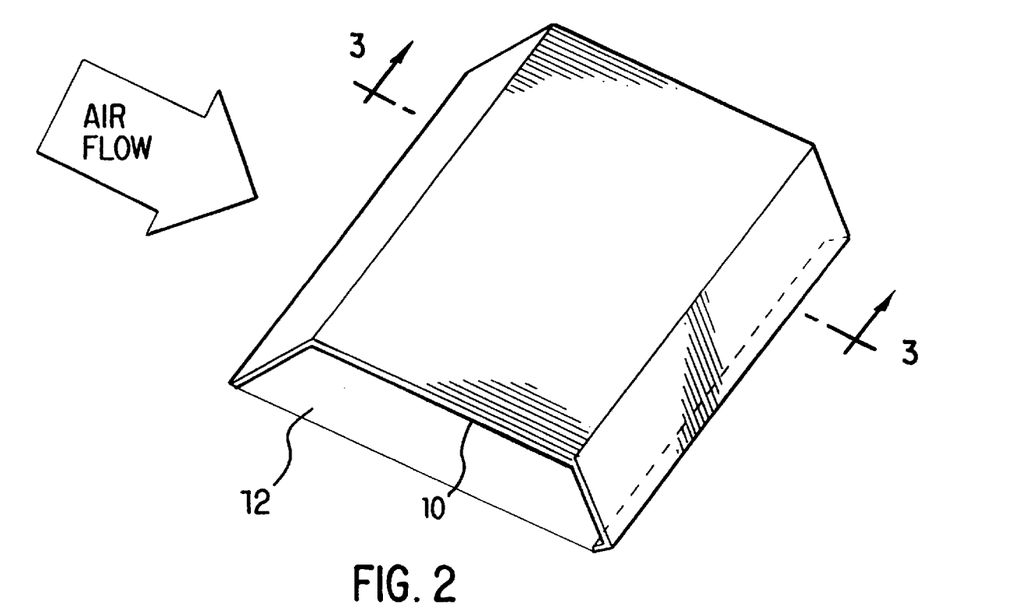
FIG. 2 is a perspective view of a preferred embodiment of an airfoil in accordance with my invention.

Referring to the Figures, FIG. 2 shows a perspective view of an airfoil or blade 10 in accordance with my invention.

The cross-sectional shape of this airfoil shows that it comprises essentially a planar intermediate face portion "b" and leading "a" and trailing "c" edges associated with opposite longitudinal edges of said intermediate portion, such that the cross-sectional shape is pan-shaped having concave and convex surfaces; with a flange "d" extending from the trailing edge "c" back toward the leading edge "a" in the concave area. The end is capped at 12.

This blade is mounted so that the wind impinges first upon the lead edge "a".

It is theorized that the preferred blade shape and positioning captures air rather than let it pass freely through the apparatus. This has several effects. First, it causes aerodynamic lift. Secondly, it can trap air and increase the driving force.

Also, in a windmill, the adjacent blade can enhance the lift. The device will not continuously accelerate and break up because the relative wind change due to rotation reduces lift acting as a braking action as the angle of attack approaches the zero lift range. In operation, this means that the device collects as much force as possible, even though it is going slower rather than faster; as in the prior art.

It has been observed that with less blades at high relative wind angles there is greater speed while, when using this device with more blades, there is more torque and lower speed.

A number of prior art blade shapes, as shown by the shapes illustrated schematically in FIGS. 1A through D were tested using a wind tunnel. The blades shown from the top are: blade 1A, an ordinary airfoil carved from balsa wood in the shape used by NACA (the predecessor of NASA) for lower speed aircraft (such as gliders or model airplanes) to provide the highest lift known; a fan blade airfoil made of plastic, 1B; an airfoil blade of the type shown in U.S. Pat. No. 4,655,122, 1C; and an airfoil with a flap at the back (also per NACA) as shown in 1D.

Figure 3:
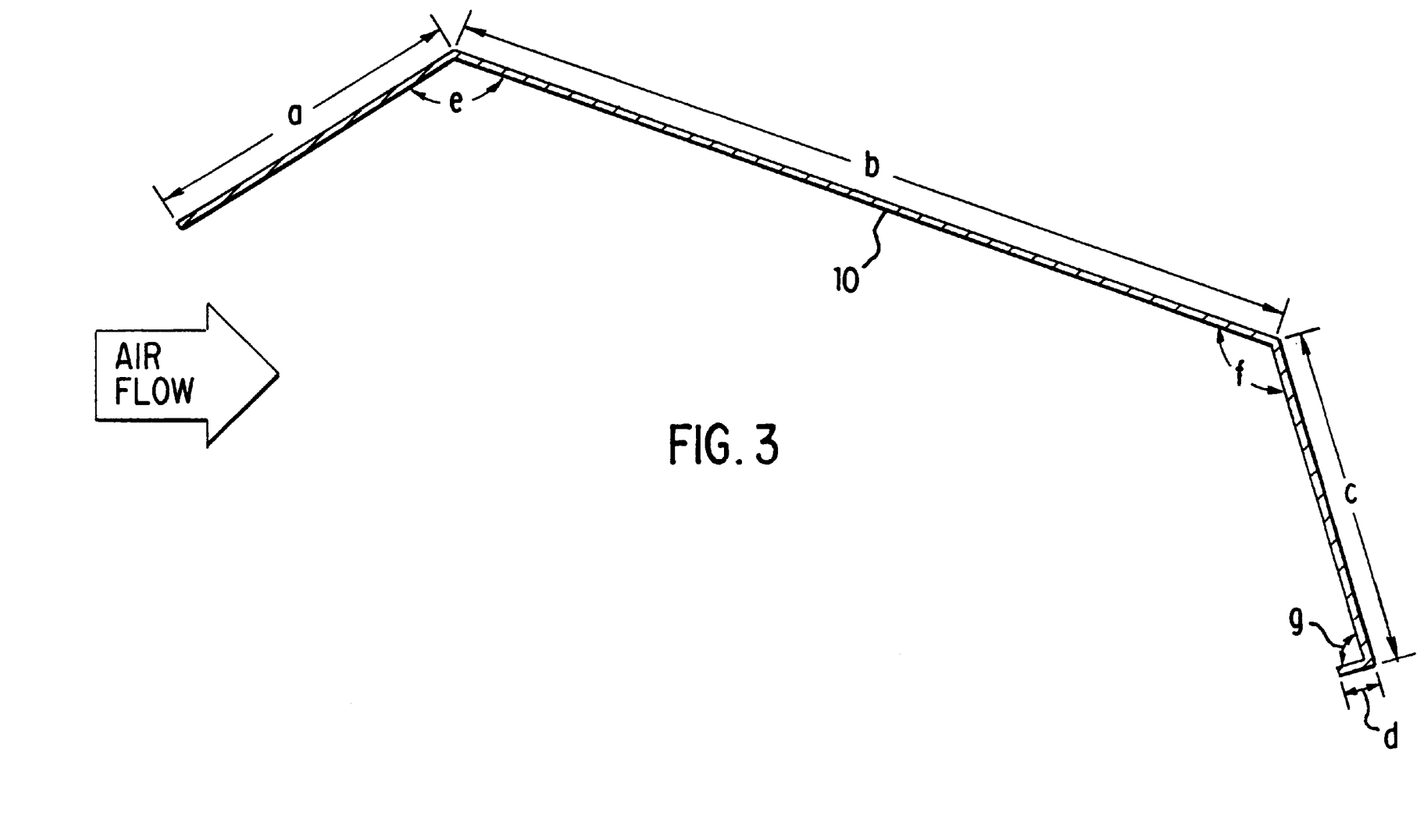
FIG. 3 is an enlarged cross-sectional view of the airfoil shown in FIG. 2 taken as indicated by the lines and arrows 3—3 in FIG. 2.

Experiments focused on the torque enhancement from air flow inducement provided by windmills and blades or "air dams" which were designed to harness the most force possible from a given air flow. Blades were selected for their ability to maximize force. Tests were conducted to establish a relationship between air mass flow and volume stored under pressure (density). The object was to determine the spacing and fluid flow interaction between blades which would yield the most force, thus determining the number of blades to be used in a windmill. For preliminary testing, it was decided to use fourteen blades at much lower relative wind angles in an eight foot windmill. A total of seventeen blade prototypes were made and tested. The drawings, FIGS. 1A through 1D each show a representative sample of a prior art blade cross-sectional configuration. FIGS. 2 and 3 show my invention, which was also tested.

Aside from the blade airfoil shape, the most important relationship found in this testing insofar as windmills were concerned was the relative wind alignment and angle of the blades. It is theorized that while blade position is not the most important factor concerning the amount of force reading; it is a very important factor in the magnitude of the mill torque readings.

As for noise, my blades are quiet, due to the low rpm. No tip noise can be heard from the ground. Also end (blade) caps are used.

As for diameter, my windmill develops twice the torque of conventional mills which means it can be made to a much smaller diameter and still generate the same horsepower.

I have developed a windmill utilizing my novel low-speed air foils and end caps. Energy generated by the mill at a variety of wind speeds is significant. Use of the mill is to make electricity, compressed air or provide direct mechanical power. This flexibility can serve a variety of smaller individual site applications. The design choices can simplify the total power producing and transmitting system, making it economical and practical for use at a variety of locations to fill many energy requirements, such as a milking operation which can have a mill to directly supply vacuum instead of making electricity and then operating the pumps.

There are other technical enhancements that have measurable effects:

1. Straight tip and root edges 90° to blades axes.
2. Restriction of natural outward air flow at both tips and roots by caps or cylindrical shrouds.
3. A venturi like shroud helps, but may not be worth the cost.
4. Setting blade angles (helical path) to limit RPM, or set the threshold of power to a chosen wind speed.

Windmill Air Foil Design

In order to extract energy from relatively low wind velocities, an airfoil designed by me is utilized to control air flow inducts in large buildings. See U.S. Pat. Nos. 3,204,548; 4,655,122 and 5,599,172.

These foil modifications maximize low speed lift and energy extraction at a fixed blade angle optimal for average wind velocities, and can extract a significant amount of energy in wind speeds as low as 16 kilometers per hour. The unique blade cross section (FIGS. 2 and 3) can be produced from relatively light weight material such as aluminum. The blade shape has no twist, and because the material is of constant thickness both from root to tip and from leading to trailing edge, blade fabrication is relatively straightforward and inexpensive to produce in large quantities.

Figure 3A:
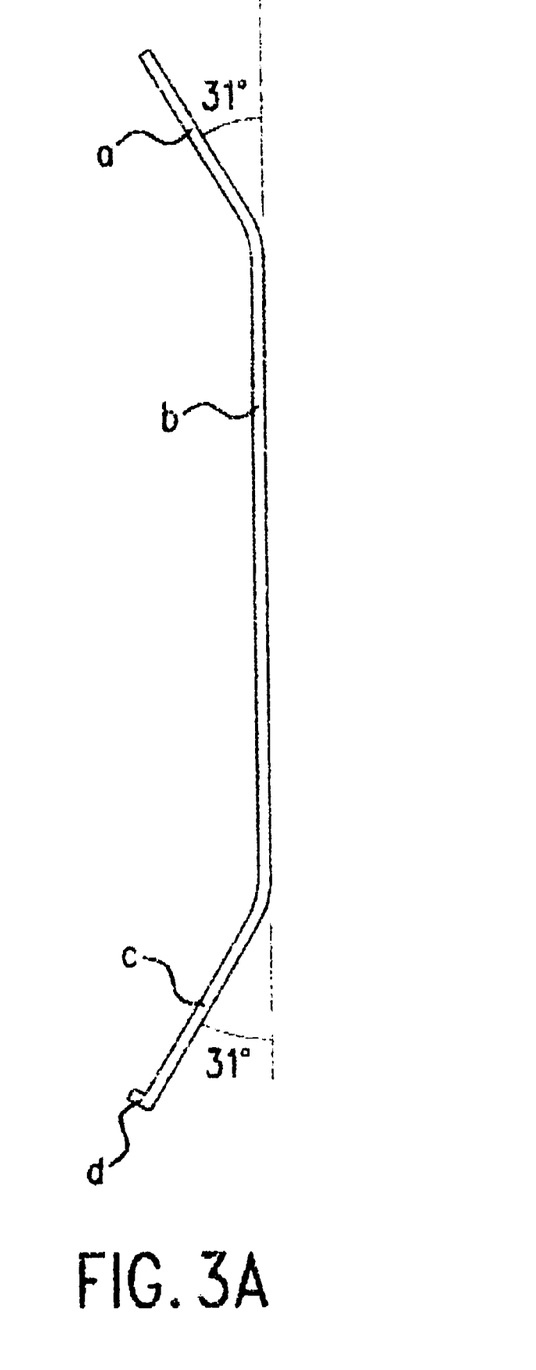
FIG. 3a is a cross section of another embodiment of my invention.

As an example of the exact measurement and construction of the blade shown in FIG. 3a, the dimensions are as follows: the leading edge, a=2.375"; the intermediate planar portion, b=6.750"; the trailing edge, c=2.375"; the flange, d=0.187"; the inner radius r.1 is sharp and the corner radius r.2 is rounded for the flange, rather than sharp as in FIG. 2; the radii R are rounded for fans and windmills and sharper 0.100" for propellers; and angle g between the portions c and d is 90°.

The cross-sectional shape of this blade shows that it comprises essentially a planar intermediate face portion "b" and leading "a" and trailing "c" edges associated with opposite longitudinal edges of said intermediate portion, such that the cross-sectional shape is pan-shaped having concave and convex surfaces; with a flange "d" extending from the trailing edge "c" back toward the leading edge "a" in the concave area.

The lift generated by this airfoil has been measured in two low speed wind tunnels and compared to other designs. Of the various shapes tested using comparable surface areas, preliminary data suggests that this design generates lift which is approximately 2.4 times greater than that created by a conventional airfoil at a wind speed of 27 kilometers per hour, and 1.7 times greater at 40 kilometers per hour. Additional tests with vertical sides (caps) mounted on the airfoils, simulating a shroud, resulted in my airfoil showing even greater comparable lift.

Blade lift and force generated from wind impact are two of several variables in the design of an efficient wind machine; which is also dependent on other factors. Initial tests with this system show that blade interaction is significant. One blade can reduce the lift of another adjacent blade, and thus blade spacing is important.

The optimum blade angle depends in part on the average wind speed, and on the portion of energy created by lift versus impact force. A functional prototype contained 14 blades radiating from a central hub with an axial incidence of 40°, resulting in an average angle of attack of 33° to the relative wind. I have found this to be close to optimal for slower wind velocities between 15 and 30 kilometers per hour. Higher angles of incidence can be used to advantage in higher winds, but overspeed must be avoided. Lift, as well as impact, are the sources of energy production.

Because the relative wind angle between the blades is effectively reduced as wind velocity increases, the system decreases in torque which limits rotational rate. The blades effectively become flat to relative wind at high speeds. Thus, a finite force limit is reached, virtually eliminating the likelihood of machine destruction due to overspeed in very high winds. Rotational rate can be limited by blade angle.

Shroud and Support Design

Figure 4:
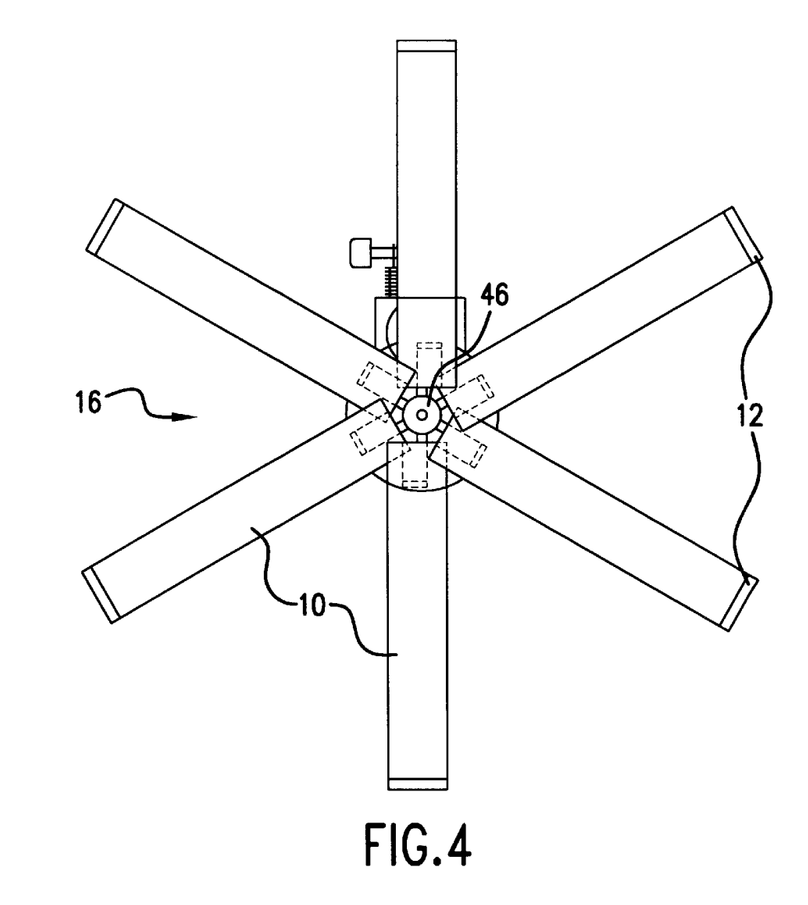
FIG. 4 is a front elevation of a windmill device in accordance with the preferred embodiment of my invention.

My airfoil used as a structural motion device optimally needs end caps. End caps 12, FIG. 4 are economical. End shrouding is possible using inner and outer cylinders at the blade roots and tips. A cylindrical housing 22, FIG. 5 in the center of the assembly surrounds the airfoils, preventing energy from being lost through air exhausting outboard (and inboard) from the blades. Conical hub 24, FIG. 5 and outer housing enhancements increase performance, but are also expensive.

The housing for the horizontal wind machine has been designed to maximize energy production. The overall shape can act as a venturi, where entering air is accelerated in a cone shaped section 26, FIG. 12, the blades are housed in a fixed diameter mid section, and exiting air is expanded in a reversed conical section 28, FIG. 9 with a trailing symmetrical shroud to maximize the reduction of exiting air pressure (see my U.S. Pat. No. 5,599,172). A nose cone 30, FIG. 9 also contributes to the design efficiency.

The entire shroud may be attached to the blade sections and rotates as a single unit, aiding in maintaining momentum once rotation is established. Blade stability, rigidity and durability are also augmented by this design.

The conical intake section of the shroud funnels air into the rotational portion containing the airfoils, increasing dynamic pressure and speed of the incoming air for blade presentation.

The exhaust section expands outgoing air, reducing back pressure on the blades to aid in extracting maximum wind energy, while the trailing cylindrical section assists with this process and helps induce air through the machine. Because the exhaust shroud portion is larger than the intake, it also aids steering of the machine towards the prevailing wind direction.

A nose cone is mounted forward of the hub of the machine, in the interior of the intake and ahead of the blades. That cone diverts air outward towards the most efficient span section of the airfoils, and streamlines the rotational hub to reduce drag.

Figures 9, 9A, 9B:
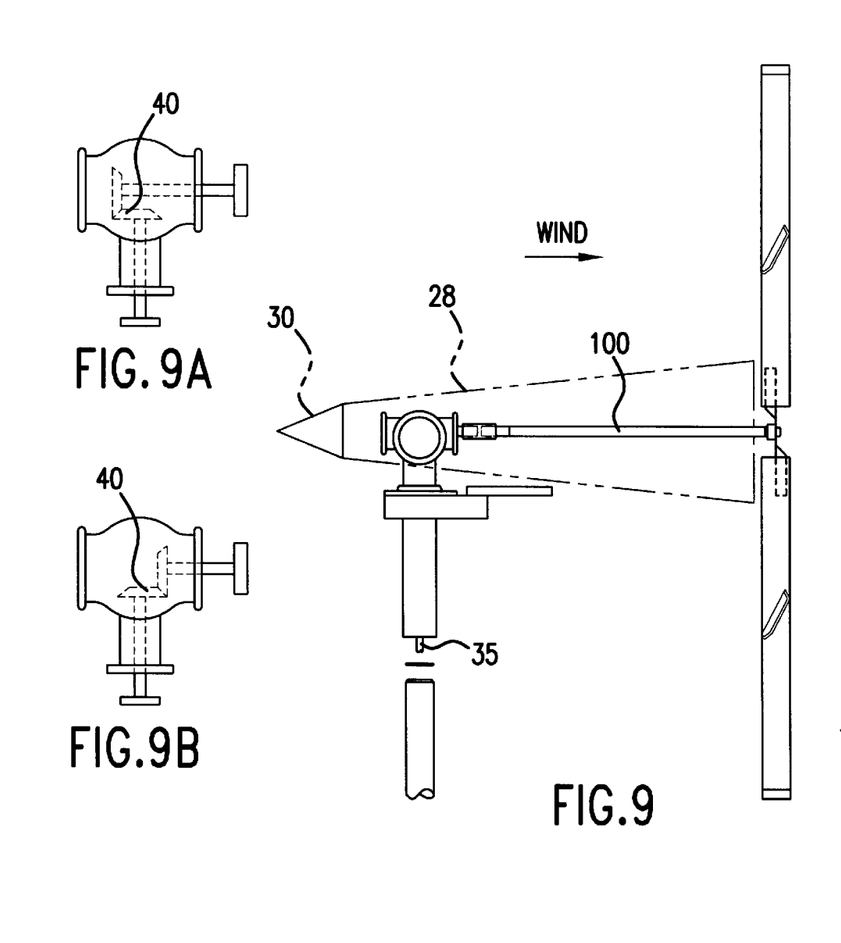
FIG. 9 is a side view of another alternate embodiment of my invention.
FIG. 9A is an enlarged view of a portion of the apparatus shown in FIG. 9.
FIG. 9B is a view of the apparatus shown in FIG. 9A in an alternate arrangement.
Figure 12:
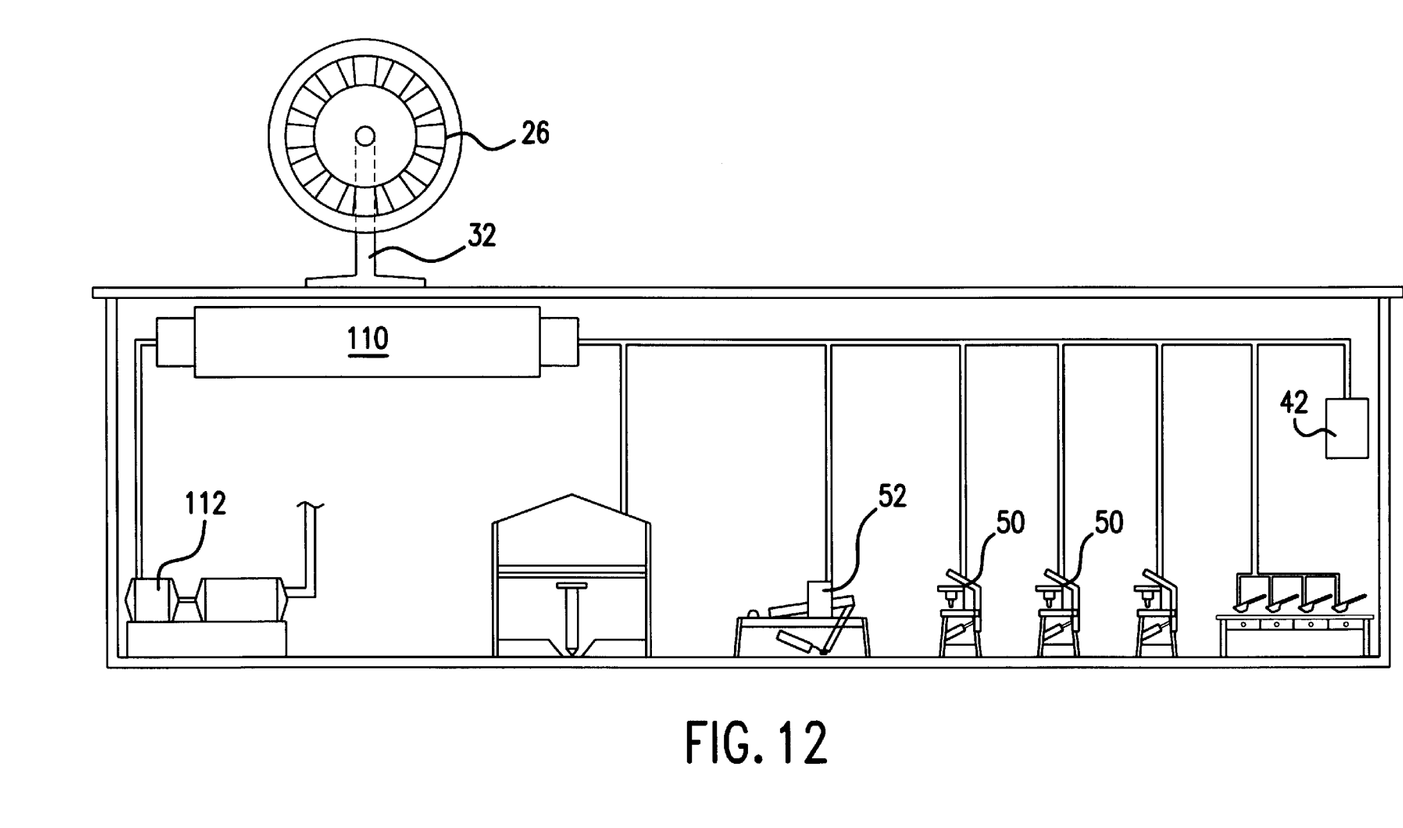
FIG. 12 is a schematic showing the use of my invention in various applications.

The total assembly is mounted atop a vertical pole 32, FIG. 12, consisting of a rigid outer tube housing attached to the support structure, and a free turning internal pipe 35, FIG. 9 which allows the assembly to pivot into the wind. A central reciprocating shaft driven by the machine for transmission of the generated energy is used to compress air, run a generator and for direct mechanical drive, such as by use of a direct or gear arrangement 40, FIGS. 9A and 9B. An air compressor 42, FIG. 12 can be mounted in the base of the support structure or forward or aft of the shroud. If applications require the direct production of energy in forms other than compressed air, a power takeoff can be substituted to drive a water or hydraulic pump, or an electric generator. Compressed air has a storage advantage that can be further enhanced by heat/cold exchangers.

I have observed that:

1. Windmill airfoils' drag seriously inhibits power production (Betz Law); so a new airfoil must decrease drag (higher L/D).

2. High angle of attack to wind flow causes unlimited mill speed when the relative wind helix never reduces angle of attack to less than 5%–8%.

3. Varying angle of attack to wind speed would be helpful—or the airfoil should have a flat power curve over a wider range.

4. A wider, flatter angle of attack to lift means expensive geometric twist can be eliminated.

5. AC electricity is expensive to make, so 12 or 24 v DC for a local to mill use is more practical and has the availability of virtually a complete range of appliances—and can be stored in batteries.

6. Direct mechanical power is much more efficient than making electricity.

7. Compressed air is very useful and can do many jobs better and much cheaper than electricity; and can be stored.

Windmill Structures and Systems

In my prior U.S. Pat. No. 5,599,172, I disclose a windmill mounted on a frame having a venturi-configured shroud, a plurality of blades mounted between a core and the throat of the venturi, and a transmission system for converting the rotation of the windmill into compressed air for storage. I have now refined those basic concepts and developed new and improved windmills and structures such as those disclosed in FIG. 4, et seq.

Figure 5:
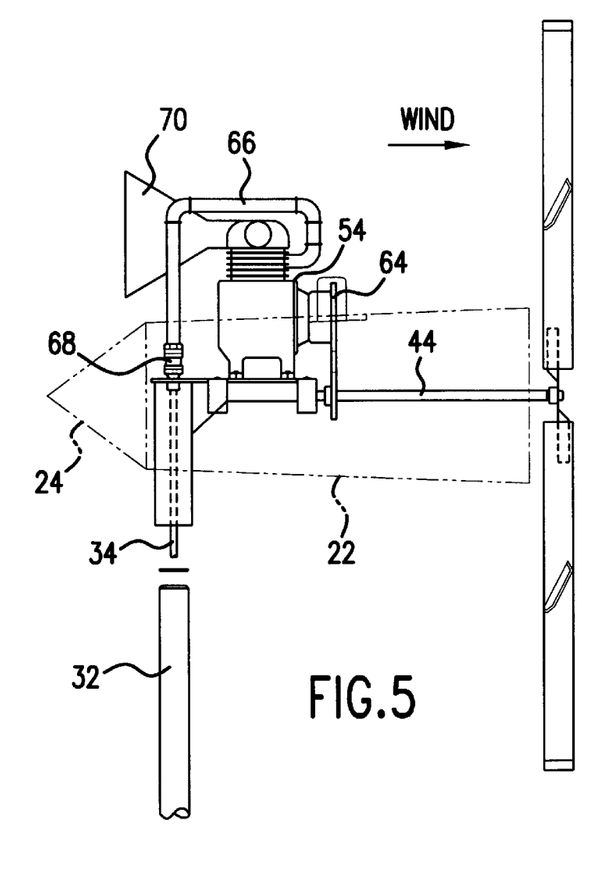
FIG. 5 is a side view of a device using that windmill in accordance with my invention.

The windmill 16 comprises six equally-spaced blades 10, FIG. 4 mounted on a shaft 44, FIG. 5, each of the blades having capped ends 12, as shown, for example, by the cap 12 in FIG. 2 which seals off the end of the pan-shaped blade. Each blade is fixedly attached to the hub 46, FIG. 4 by any suitable means and the hub is fixedly attached to the shaft for rotation therewith, as shown in FIGS. 4 and 5.

1. Compressed Air Systems:

I have worked mostly on compressed air systems which, combined with air power metal working equipment, appears to have much usage potential. Mills to a maximum of 18' diameter are feasible. Compressed air directly into storage on a use as needed basis, seems to be much more efficient than electric motors. Even high efficiency motors draw up to 80% of F.L.A. while idling. Thermodynamics of compressed air is important to consider to use or eliminate by heat interchange.

Air Systems include:

a. Power air tools 50 and equipment 52, FIG. 12;

b. Pump water by compressed air cylinders; and c. Vacuum production for milking.

Figure 6:
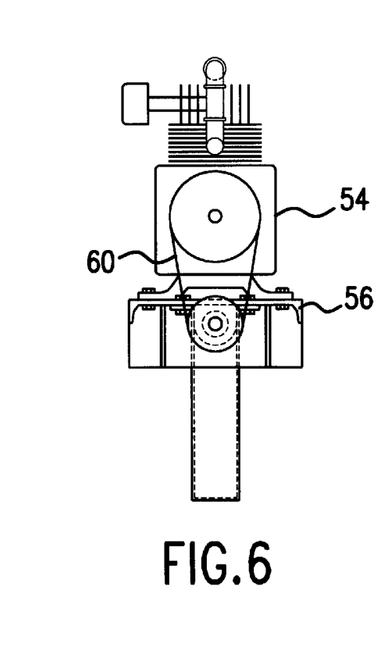
FIG. 6 is a front view of the portion of the device shown in FIG. 5.

FIGS. 4, 5 and 6 show a compressor-type windmill arrangement in which a compressor 54 is fixedly mounted to a stand 56 into which an extension of the shaft is journaled. Mounted on the shaft is a sprocket gear 58 to rotate therewith. A roller chain 60, FIG. 6 (optional to direct drive 62, FIG. 11) is disposed about the sprocket gear in engagement with the sprockets. The roller chain also engages the sprockets 64 of a shaft of the compressor. Thus, as the windmill turns, the shaft turns, and the sprocket gears turn, driving the compressor to compress air. The compressed air passes through pipes 66 connected to the discharge of the compressor. The pipe terminates in a swivel coupling 68 which allows it to be connected to a hose 34, FIG. 5 and still move as the operation of the equipment demands.

The ram air intake (funnel 70) FIG. 5 aids compressor efficiency.

The discharge from the hose goes into a storage tank (not shown, but conventional per se).

In this type of arrangement, I found it useful to have a substantially frustroconical/conical cover disposed about a portion of the air compressor. See 22, 24 FIG. 5.

2. Electrical:

Focusing on 12 or 24 volt DC using a self-excited alternator on mills less than 5' in diameter. No complicated cycles or voltage controls are needed.

Figure 7:
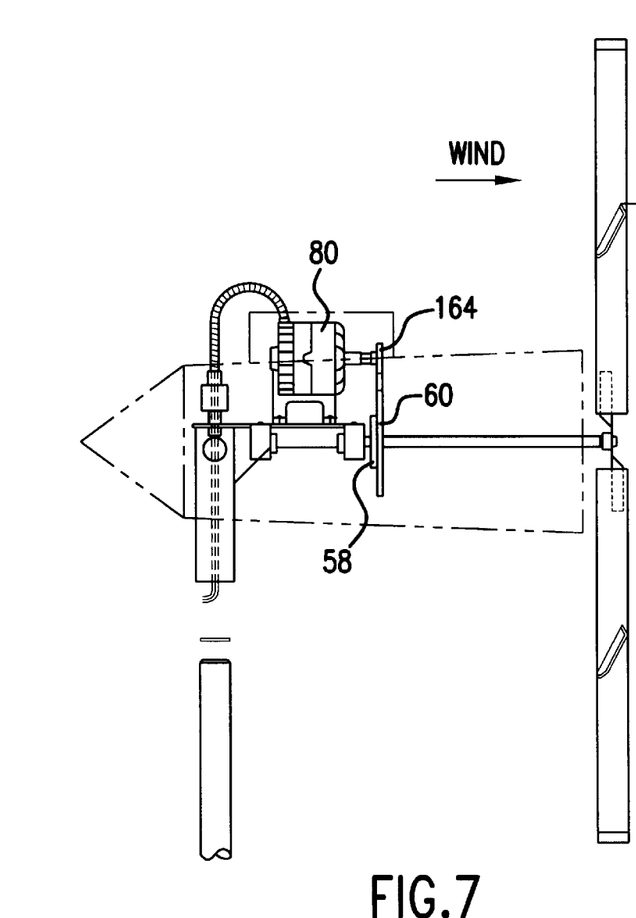
FIG. 7 is a side view of an alternate embodiment of a device utilizing my windmill.
Figure 8:
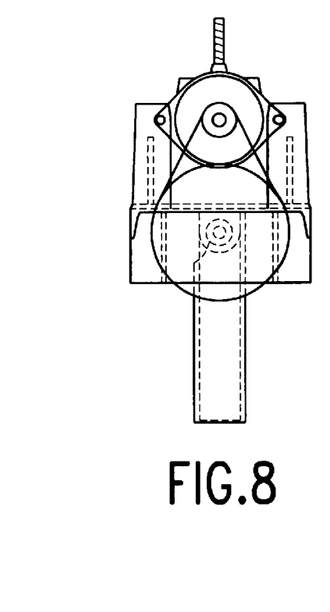
FIG. 8 is a front view of a portion of a device shown in FIG. 7.

In the arrangement shown in FIG. 7, the roller chain 60 drives a sprocket 164 connected to a shaft of a generator 80. Here, the generator's electrical connections are connected to the swivel arrangement on the mounting pipe.

Once again, I found it useful to provide a cover for the apparatus.

3. Direct Power:

Mills to 18' (or perhaps 20') in diameter are feasible. Initially I focused on smaller mills less than 7' in diameter.

Figure 10:
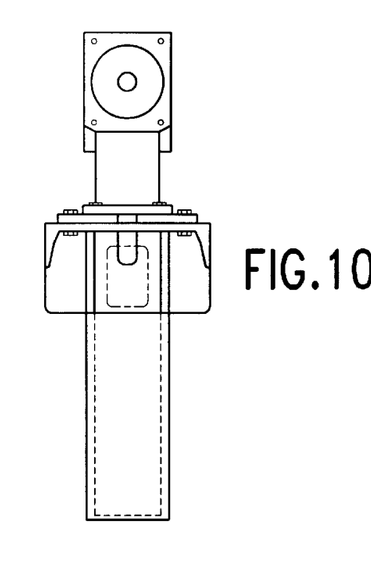
FIG. 10 is a front view of a portion of the embodiment shown in FIG. 9.
Figure 11:
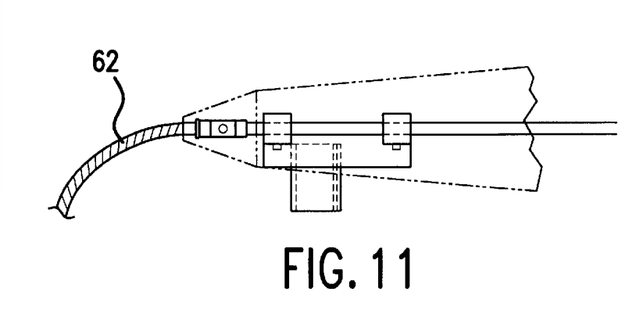
FIG. 11 is a partial view similar to other side views as shown and described above, showing an alternate embodiment of my invention.

In FIGS. 9 and 10, I disclose a direct drive windmill. In this case, the shaft 100 is directly coupled through a gear drive 40, FIGS. 9A and 9B or, optionally, to a flexible drive 62, as shown in FIG. 11.

Windmill Systems

In FIG. 12, I show schematically the use of a windmill device to run machinery in a factory. In this arrangement, compressed air from the windmill can be stored in an air holding tank 110. This air can be used to drive air motors 112, to generate electricity, to actuate pneumatic tools, such as presses 50, shears 52, and other air driven tools, and can also be used to deliver compressed air to the intake of an air compressor 42. Normally, in an air compressor, as the piston draws back and pulls in air, it is losing energy. By connecting an air compressor intake to a source of compressed air, I am able to reduce that effect and make the air compressor many times more efficient.

One or more windmills may also be mounted on a vehicle such as a car or a truck to compress air and store that air on the car or truck for use in driving such a vehicle, if the vehicle is powered by air.

What I claim is:

1. A windmill apparatus comprising: a windmill, a transmission means connected to said windmill for transmitting the energy from said windmill to an air compression means connected to said transmission means for compressing air; said windmill comprising a plurality of blades fixedly connected to and spaced radially about a rotatable first shaft; each of said blades having a shape comprising an intermediate face portion and leading and trailing longitudinal edge portions associated with opposite edges of the face portion to form, in cross-section, an essentially pan-shaped structure having a convex surface and a concave surface, and a flange portion extending at an angle of approximately 90 degrees from the trailing edge portion back toward the leading edge portion on the concave side; and an end cap on the end of the blade remote from the first shaft.

2. The windmill of claim 1 wherein there are a plurality of said blades positioned at approximately 60 degree angles from each other and angled to the direction of air flow through said windmill.

3. The apparatus of claim 1 further comprising a mounting means connected to said windmill for mounting said windmill and said transmission means; said transmission means comprising a rotatable second shaft connected to said mounting means and connected to said rotatable first shaft of said windmill to rotate therewith in response to rotation of said windmill; said transmission means further comprising a sprocket gear mounted to said second shaft; a sprocket gear mounted to said air compression means; and a chain engaging both sprocket gears to rotate same in response to rotation of said second shaft and drive said air compression means.

4. The apparatus of claim 3 wherein a frustroconical/conical cover is provided mounted about a portion of the second shaft and air compression means.

5. The apparatus of claim 3 wherein discharge tubing is provided between the compression means and the mounting means for said windmill, said tubing being rotatably connected to a conduit for receiving said compressed air from said air compression means and transmitting it to a storage means for retaining said air.

6. A windmill apparatus comprising: a windmill means, a transmission means connected to said windmill for transmitting the energy from said windmill to a generator means connected to said transmission means for generating electricity; said windmill comprising a plurality of blades fixedly connected to and spaced radially about a rotatable first shaft; each of said blades having a shape comprising an intermediate face portion and leading and trailing longitudinal edge portions associated with opposite edges of the face portion to form, in cross-section, an essentially pan-shaped structure having a convex surface and a concave surface, and a flange portion extending at an angle of approximately 90 degrees from the trailing edge portion back toward the leading edge portion on the concave side, and an end cap on the end of the blade remote from the first shaft.

7. The apparatus of claim 6 further comprising a mounting means connected to said windmill for mounting said windmill and said transmission means; said transmission means comprising a rotatable second shaft connected to said mounting means and connected to said rotatable first shaft of said windmill, to rotate therewith in response to rotation of said windmill; said transmission means further comprising a sprocket gear mounted to said second shaft; a sprocket gear mounted to said generator means; and a chain engaging both sprocket gears to rotate same in response to rotation of said second shaft and drive said generator means.

8. The apparatus of claim 6 wherein a frustroconical/conical cover is provided mounted about a portion of the second shaft and generator means.

9. A windmill apparatus comprising: a windmill, a transmission means connected to said windmill for transmitting the energy from said windmill directly to force generation means; said windmill comprising a plurality of blades fixedly connected to and spaced radially about a rotatable shaft; each of said blades having a shape comprising an intermediate face portion and leading and trailing longitudinal edge portions associated with opposite edges of the face portion to form, in cross-section, an essentially pan-shaped structure having a convex surface and a concave surface, and a flange portion extending at an angle of approximately 90 degrees from the trailing edge portion back toward the leading edge portion on the concave side; and an end cap on the end of the blade remote from the shaft.

10. The apparatus of claim 9 wherein the force generation means comprises a shaft connected to said windmill to rotate therewith and a coupling for engaging and driving a force activated means.

11. A windmill apparatus comprising: a windmill; an air compressor; a transmission means connected to said windmill for transmitting energy derived from the movement of said windmill to said air compressor for compressing air; storage means for storing the air compressed by said compressor, a second air compressor, having an air intake; and means connecting said storage means to said air intake to supply compressed air to the intake of said second compressor, said windmill comprising a plurality of blades fixedly connected to and spaced radially about a rotatable shaft; each of said blades having a shape comprising an intermediate face portion and leading and trailing longitudinal edge portions associated with opposite edges of the face portion to form, in cross-section, an essentially pan-shaped structure having a convex surface and a concave surface, and a flange portion extending at an angle of approximately 90 degrees from the trailing edge portion back toward the leading edge portion on the concave side; and an end cap on the end of the blade remote from the shaft.

12. The windmill apparatus of claim 1 wherein the blade is of substantially uniform thickness.

13. The windmill apparatus of claim 6 wherein said blades are of substantially uniform thickness.

14. The windmill apparatus of claim 9 wherein the blade is of substantially uniform thickness.

\* \* \* \* \*